United States Patent
Lecy et al.

(10) Patent No.: US 7,523,720 B1
(45) Date of Patent: Apr. 28, 2009

(54) PET HOOD

(76) Inventors: Lynda Lecy, 3019 N. Wheeler St., Roseville, Ramsey, MN (US) 55113; Duane Lecy, 3019 N. Wheeler St., Roseville, Ramsey, MN (US) 55113

(*) Notice: Subject to any disclaimer, the term of this patent is extended or adjusted under 35 U.S.C. 154(b) by 1232 days.

(21) Appl. No.: 10/242,995

(22) Filed: Sep. 12, 2002

(51) Int. Cl.
*A01K 15/04* (2006.01)

(52) U.S. Cl. ...................... 119/832; 119/821

(58) Field of Classification Search .......... 119/814, 119/815, 821, 831, 832, 850, 856, 654; 54/80.1, 54/80.3, 80.2, 80.4, 80.5; D22/119; D30/144
See application file for complete search history.

(56) References Cited

U.S. PATENT DOCUMENTS

| | | | |
|---|---|---|---|
| 66,840 A | 7/1867 | Howe | |
| 421,109 A * | 2/1890 | Seaman | 119/832 |
| 929,415 A | 7/1909 | Ewer | |
| 960,142 A | 5/1910 | Anctil | |
| 1,004,507 A * | 9/1911 | Walz | 2/4 |
| 1,052,749 A | 2/1913 | Peelman | |
| 1,070,914 A | 8/1913 | Raveling et al. | |
| 1,110,232 A | 9/1914 | Raveling et al. | |
| 1,175,033 A | 3/1916 | Williams | |
| 1,256,625 A | 2/1918 | Westfall | |
| 1,297,753 A | 3/1919 | Twitchell | |
| 1,297,842 A | 3/1919 | Harllee | |
| 1,300,977 A | 4/1919 | Kehr | |
| 1,311,933 A | 8/1919 | Weigel | |
| 1,318,477 A | 10/1919 | Bristol | |
| 1,362,276 A | 12/1920 | Waltner | |
| 1,468,416 A | 9/1923 | Rasmussen | |
| 2,073,511 A | 3/1937 | Brownson | |
| 2,298,265 A * | 10/1942 | Ashby | 119/832 |
| 2,814,923 A * | 12/1957 | Knauss | 54/71 |
| 3,150,640 A * | 9/1964 | Nevitt | 119/712 |
| 4,273,119 A * | 6/1981 | Marchello | 128/201.13 |
| 4,519,187 A * | 5/1985 | Reynolds | 54/80.3 |
| 4,796,567 A * | 1/1989 | Allan et al. | 119/678 |
| 5,005,215 A * | 4/1991 | McIlquham | 2/22 |
| 5,163,272 A * | 11/1992 | Finley et al. | 54/80.1 |
| 5,299,531 A | 4/1994 | Dietz | |
| 6,227,148 B1 * | 5/2001 | Wexler | 119/837 |
| 6,520,120 B1 * | 2/2003 | Arnold et al. | 119/850 |

* cited by examiner

*Primary Examiner*—T. Nguyen
(74) *Attorney, Agent, or Firm*—Albert W. Watkins

(57) ABSTRACT

A mesh pet hood allows an animal, with or without a snout or nose, to see relatively unencumbered and yet prevents the animal from oral contact with persons, other creatures or inanimate objects. The mesh is most preferably a soft and lightweight plastic which is not harmful when swung by the animal. The hood is laced about the animal's neck region, and preferably includes a connection to a harness or other reliable anchor. A most preferred embodiment of the pet hood further accommodates various sizes of hoods, such as small, medium and large, without requiring retooling, and only requiring three distinct components. A preferred method of manufacture and assembly involves severing repeating sections from an indeterminate-length web, attaching the severed ends together to form a tubular structure, attaching protruding tips together to close one end of the tubular structure, and drawing together trapezoidal ends opposing protruding tips.

18 Claims, 4 Drawing Sheets

PET HOOD

BACKGROUND OF THE INVENTION

1. Field of the Invention

This invention pertains generally to the field of animal husbandry, and more specifically to an apparatus to prevent an animal from biting or otherwise making oral contact and a method of making the apparatus. The most preferred embodiment pet hood of the present invention is configured to accommodate all types of pets, whether or not they have a snout.

2. Description of the Related Art

At various times, and for various reasons, the management of an animal's ability to bite or make oral contact is important. The animal may or may not, on a regular basis, require such management. As an example, and owing to circumstances that are out of the ordinary, the animal may behave unexpectedly. In such instances, an owner or care-giver who is aware of the possibility for the animal to behave undesirably may take advance precautions to preclude the animal from harming other creatures. In other situations, it may be desirable to prevent an animal from contacting other objects and entities with the animal's mouth. At times, this will include such activities as feeding, self-grooming, or a myriad of other activities that are engaged in by the animal. These activities may sometimes be normal and acceptable for the animal, but for various reasons the owner or care-giver may choose to prevent or inhibit such activity. One such example is the self-grooming that many animals engage in. Self-grooming is normally desired and preferred. However, there are times when a dog may develop an infection that does not heal normally. As is well known, the dog will tend to lick the sore repeatedly, and, in so doing, makes the sore worse. In such an instance, the owner will prefer to inhibit the animal from oral contact with the sore. Another example of an undesired activity occurs during the grooming of pets. Even the most well behaved of pets may behave erratically or dangerously during a grooming session. Depending upon the animal, such erratic behavior can seriously endanger the groomer or others in close proximity to the pet. As yet another example, some horses are prone to very undesirable nipping or biting of creatures around them. The horse may otherwise behave admirably. In such instances or in other circumstances, a person may desire to restrain the animal from such behavior.

Unfortunately the restraint of an animal may in some instances only aggravate an already difficult situation. Being frightened is a reasonable response to a strange person such as a groomer who may be armed with scissors and clippers, or to a veterinarian who may be armed with various needles and other frightening devices. An animal that is frightened needs to be consoled. However, some proposed designs of restraints involve covering an animal's eyes. Such coverings lead to extremely unpredictable behavior, and in some instances make the animal much more difficult to manage.

The vast majority of the techniques used to prevent an animal from making oral contact involve only covering the animal's mouth. This avoids the risk of unpredictable behavior associated with eye cover. A large body of patents describe various apparatus using the mouth covering, including U.S. Pat. Nos. 2,298,265 to Ashby; 2,073,511 to Brownson; 1,468,416 to Rasmussen; 1,362,276 to Waltner; 1,311,933 to Weigel; 1,300,977 to Kehr; 1,297,753 to Twitchell; 1,175,033 to Williams; 1,070,914 and 1,110,232 to Raveling; 1,052,749 to Peelman; 960,142 to Anctil; 929,415 to Ewer; and 66,840 to Howe. While a covering limited to the animal's mouth at first seems ideal, when an animal without a snout is to be restrain, the limitations of such coverings become very apparent. For example, a cat which is to be groomed cannot be retrained using the muzzles available, since these muzzles are designed to wrap about or anchor upon the extended snout of a dog or horse. A cat does not have such a snout, and the muzzle will readily slip off of the cat's mouth. At this moment, the cat may be both frightened and agitated, and the behavior will be very undesirable. In the case of cats and groomers, it is also well-known that the bite from the cat can be very harmful and dangerous, owing to the potential for very difficult-to-treat infections. Because of this danger and the present lack of suitable techniques for ensuring the safety of the groomer, many animal groomers will not groom cats.

A variety of muzzles that use different manufacturing techniques and materials have been designed to restrain oral contact by an animal, as aforementioned. Wire cages, various meshes and fabrics, and even chains and heavy metal lattice work or metal frames have been developed. As will be readily apparent, the use of heavy metal lattice work, metal frames, or chains is completely unacceptable for many of the aforementioned problems that need to be addressed. That metal, when placed about the animal's snout, will be very nearly as dangerous as the unrestrained animal. This metal may be moved rapidly by the animal when the animal is frightened, and anyone who is close enough to be struck or pinned by the metal is in much danger. Furthermore, as is known in the field of animal husbandry, irrespective of the type of muzzle there is a risk of contact. Consequently, such restraints are generally undesirable.

In addition to the limitations of the apparatus of the prior art, the methods used to manufacture those muzzles introduces significant additional limitations. Exemplary of these manufacturing techniques are U.S. Pat. Nos. 1,256,625 to Westfall, which illustrates a twisted wire muzzle; and 5,299,531 to Dietz, which illustrates a stitched fabric muzzle. As may be apparent, the equipment and labor required to twist the wire of Westfall are substantial. Similarly, the stitching of the Dietz patent also requires substantial labor, and ultimately leads to a point of premature failure, generally well before the fabric has deteriorated.

SUMMARY OF THE INVENTION

In a first manifestation, the invention is an animal restraint encircling the head of an animal. The restraint extends generally from said animal's neck region distally therefrom about said animal's nasal region. The restraint comprises a compliant and resilient neck encompassing member, a tensioning member for adjusting a diameter of the neck-encompassing member to accommodate an animal's neck region in contact therewith through a majority of neck circumference, a semi-rigid hood member extending generally from the neck encompassing member to the animal's nasal region and encompassing the animal's head therein, and a forward enclosing member generally enclosing the semi-rigid hood member distal to the neck encompassing member.

In a second manifestation, the invention is a pet hood. The hood has a resilient, semi-rigid mesh formed into repeating sections, each of said repeating sections having a protruding tip, a generally rectangular body, and a trapezoidal tail. A fastener attaches at least two repeating section protruding tips together to form a closure at a first end through which the animal's head and mouth may not pass. A gathering member collects at least two repeating section trapezoidal tails together to form a neck member. The neck member may additionally be attached to another anchor associated with the animal.

In a third manifestation, the invention is a method for manufacturing a pet hood suitable for restraining an animal from oral contact with objects or creatures other than said hood. A roll of resilient mesh is provided and then formed into first and second undulating edges to produce an indeterminate length web having repeating shapes in said resilient mesh and to produce selvage. A predetermined discrete set of possible sizes for said pet hood are calculated based upon the formation of said hood from discrete numbers of said repeating shape. At least one preferred size for a pet hood is determined, and then a predetermined number of said repeating shapes are selected from said resilient mesh corresponding to the preferred size. The predetermined number of repeating shapes are severed from the indeterminate length web along a first severing path to yield a pet hood preform, and the first severing path is engaged with a like severing path on a distal edge of the pet hood preform to form a tubular pet hood intermediate. Protrusions from the first undulating edge are engaged to enclose a first end of the tubular pet hood intermediate. Protrusions from the second undulating edge are bound together to contract a second end of said tubular pet hood intermediate, to thereby form a pet hood.

OBJECTS OF THE INVENTION

Exemplary embodiments of the present invention solve inadequacies of the prior art by providing a readily manufactured mesh enclosure which allows an animal, with or without a snout or nose, to see relatively unencumbered and yet not bit a groomer or other handler.

A first object of the invention is to provide an easy to use and reliable apparatus for preventing animals of all types from serious oral contact with creatures or objects. A second object of the invention is to provide a soft and lightweight hood which is not harmful when swung by the animal. Another object of the present invention is to enable the hood to be manufactured for a low cost and in high volume. A further object of the invention is to provide a hood that dries quickly and allows an animal to dry quickly. Another object of the invention is to provide a hood that is sanitary, and which is readily cleaned, thereby permitting use on a plurality of animals with only a simple cleaning between uses. Yet another object of the present invention is to accommodate various sizes of hoods, such as small, medium and large, without requiring retooling, while also requiring a minimum of distinct components.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
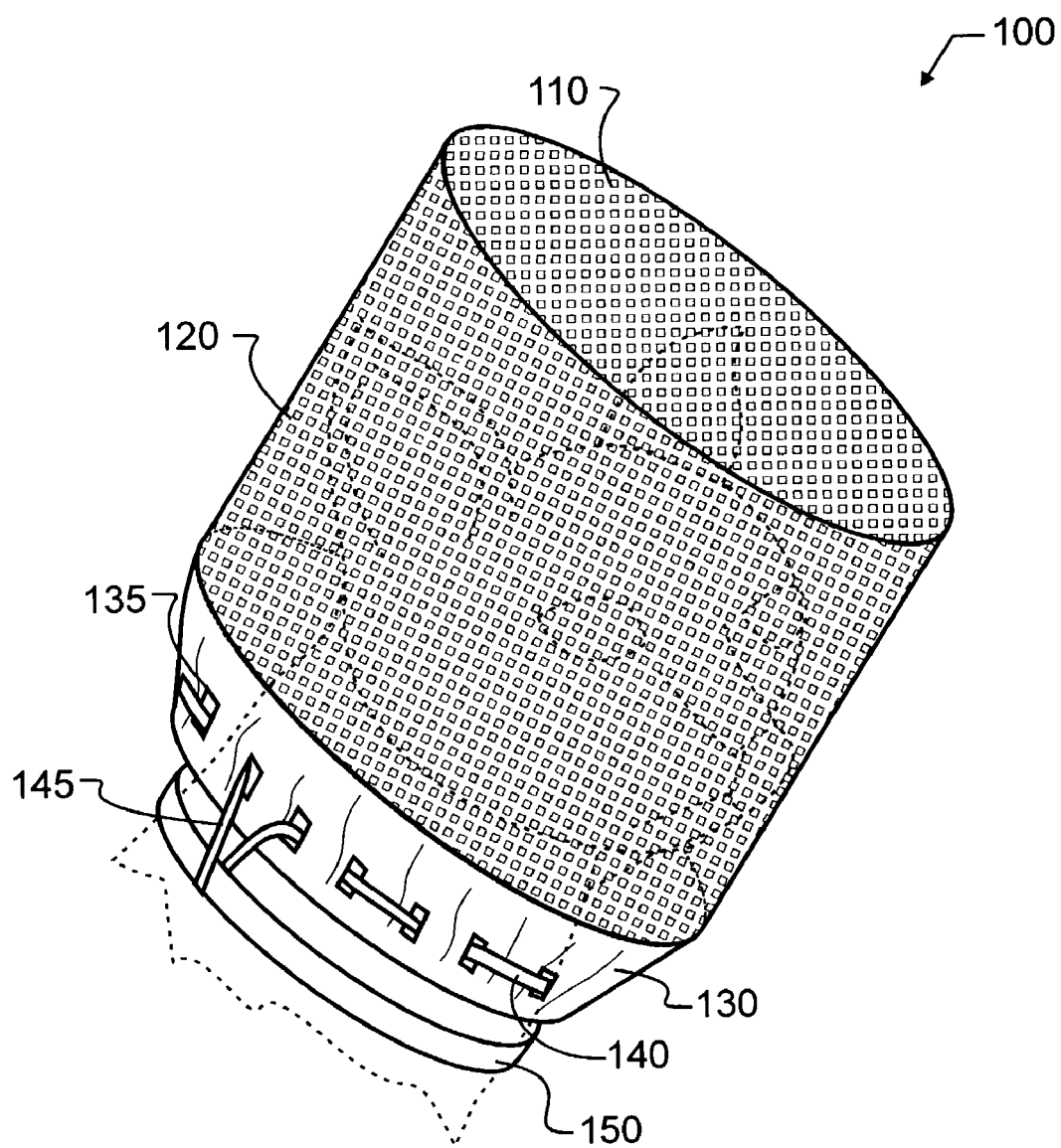
FIG. 1 illustrates a preferred embodiment hood from a projected view, in use about the head of an animal.

Manifested in the preferred embodiment, the present invention provides a mesh enclosure which allows an animal, with or without a snout or nose, to see relatively unencumbered and yet not bite a groomer or other handler. The mesh is most preferably a soft and lightweight plastic mesh. Such a mesh may be found in the craft circles. One type of mesh which is most preferred has a core material and a separate coating, each with different characteristics. One example of such a material is a nylon cord with vinyl coating, which provides superior strength against tears and punctures, while still providing a smooth surface for easy cleaning and sanitizing. The density of the mesh will most preferably be sufficient to ensure a resilience and intrinsic rigidity sufficient to limit the animal's ability to fold the material between teeth. Furthermore, the openings in the mesh are most preferably sufficiently small to prevent the animal from snagging the mesh by insertion of teeth within the weave or passing teeth partially through the weave. Yet another preferred characteristic is that of slip, or more technically a low coefficient of friction, whereby the animal will likewise tend to slide fur and teeth along the mesh without any binding or engaging therewith. The most preferred mesh will also be one which has little or no moisture absorption, and which both dries quickly and which allows an animal to dry quickly.

A first preferred embodiment pet hood 100 designed in accord with the teachings of the invention includes a disc-shaped plastic mesh top member 110. This top encloses a generally tubular semi-rigid plastic mesh hood member 120 which most preferably encircles the pet's head. Both top 110 and hood member 120 will most preferably be sufficiently open to allow the animal to see clearly through. The coloring is not critical to the performance of the invention, and will vary depending upon the desires of the user and the constraints such as availability of suitable material in a particular color. Transparent or translucent materials may be used as well.

A neck encompassing member 130 serves to wrap about the animal's neck, and most preferably fully encircles the neck. A drawstring 140, which may be a lace such as found in shoes, bags or the like is provided, and, for exemplary purposes, passes through a plurality of eyelets or openings 135 formed in neck encompassing member 130. While holes 135 are illustrated, it will be understood to those skilled in the art that any type of retaining may be used which ensures drawstring 140 stays associated properly with neck encompassing member 130. Contemplated for this purpose are such devices as loops as would be found in pants, a fold as may be found at the bottom of jackets and the tops of drawstring-type bags, and any other suitable means.

The purpose of neck encompassing member 130 is to retain pet hood 100 about the pet, preventing the pet from removing the hood. Since not all pets may have sufficient size changes between neck and head to ensure pet hood 100 will stay in place, a loop 145 may be provided in drawstring 140 which is attached to a collar 150 or other pet anchor, such as a harness or the like. In fact, any additional structure that may already be associated with the animal and which will assist in retaining pet hood 100 in place may be used. Alternative to loop 145 are other methods of attachment, such as Velcro and straps, snaps, buttons and other fastening techniques. Preferably, the method of fastening is readily removable, so that hood 100 may be placed onto the pet easily and also removed easily.

Figure 2:
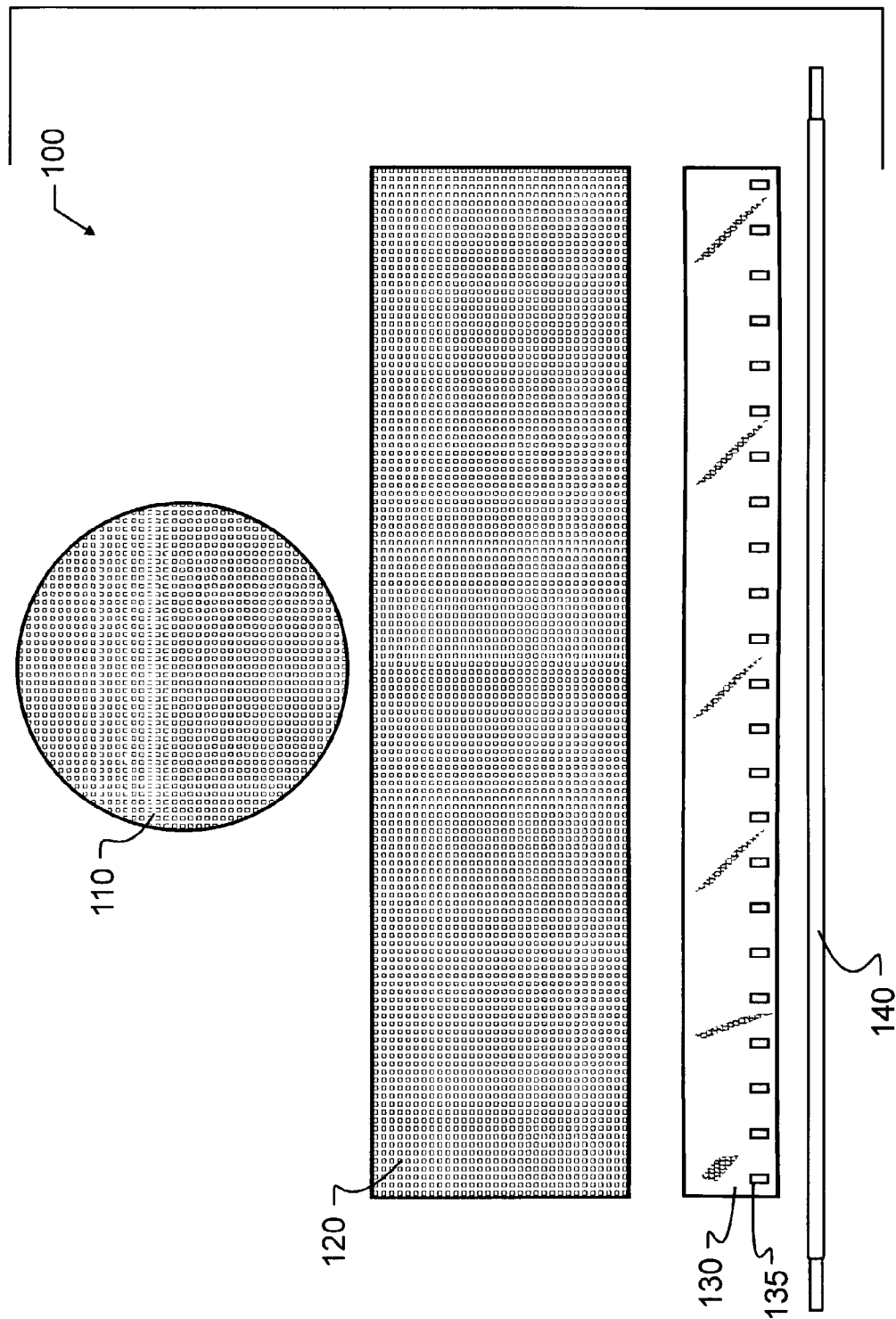
FIG. 2 illustrates the preferred embodiment hood from a disassembled plan view.

FIG. 2 illustrates pet hood 100 in an unassembled form, showing the pre-assembly shapes and the necessary components. As will be apparent therein, very few components are required. The actual assembly will vary depending upon the exact choice of material for plastic mesh used in top member 110 and hood member 120. Contemplated techniques include thermal or ultrasonic bonding, laser welding, adhesive attachment, threading, weaving or other suitable technique. Similar techniques will be used for attachment between hood member 120 and neck encompassing member 130. Further, the material used for neck encompassing member 130 is far less restrictive, owing to the distal arrangement relative to the pet's mouth and eyes.

Figure 3:
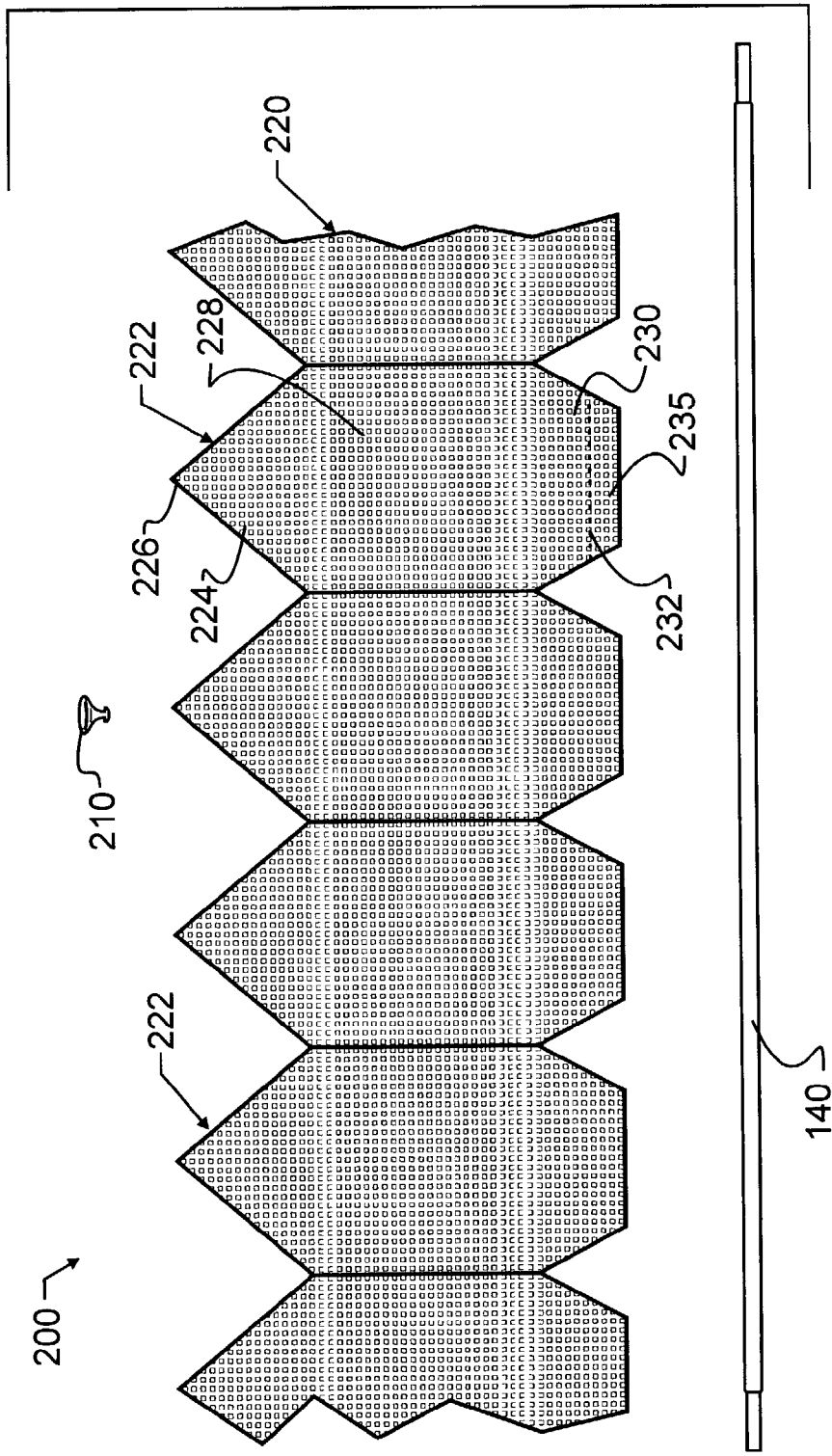
FIG. 3 illustrates a second embodiment hood from a disassembled plan view.

FIG. 3 illustrates the components used in the assembly of a second preferred embodiment of the invention, laid flat as in FIG. 2. In this pet hood 200, a single indeterminate length web 220 is used as the source material for the manufacture of the entire hood. Web 220 includes a number of repeating patterns 222 which are defined by protruding tops 224, rectangular body members 228, and trapezoidal bottoms 230. While not essential, most preferably each trapezoidal bottom member 230 additionally includes a fold line 232, about which portion 235 may bend and wrap, to form an enclosure through which drawstring 140 may pass.

Figure 4:
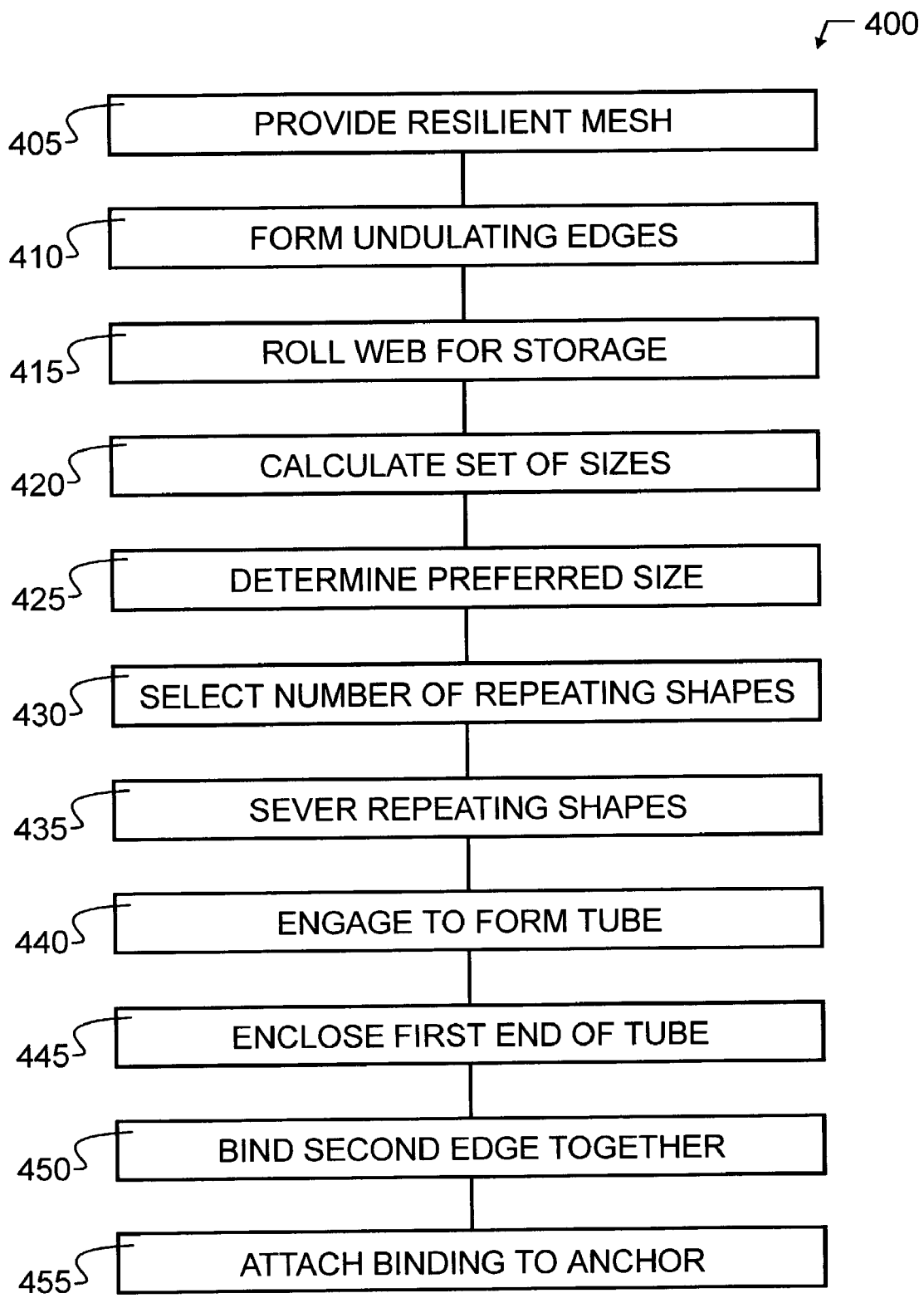
FIG. 4 illustrates a preferred method of assembly in accord with the invention.

This unique geometry allows a person to cut a particular number of repeating segments 222 from web 220 which are sufficient to create at least the diameter desired for the pet hood 200. Since the web 220 may be of any length, and since the pattern is repeating, manufacturing processes are simplified as shown by the method illustrated in FIG. 4. More particularly, web 220 will be provided as shown at step 405, and while this may be flat mesh in sheets, most preferably web 220 will originate from a roll of mesh of standard size and dimension. The roll may be unrolled and fed through a cutting machine, which may be a die-cutting, stamping, shearing, laser cutting or other type of severing machine. First and second undulating edges which comprise protruding tip 224 and trapezoidal bottom 230 are formed, to produce an indeterminate length web 220 having repeating shapes 222. Salvage is also produced, which will typically be ground and re-used or recycled. Next, the web may be rolled for storage and use as demanded, as shown in step 415. Important here is the fact that the web serves as the basis for any diameter of pet hood 200 desired, and only requires a single source roll.

Because this web 222 serves as the source, a person will calculate a predetermined discrete set of possible sizes for the pet hood as shown in step 420, based upon the formation of pet hood 200 from these discrete numbers of repeating shapes. At step 425, the person now determines at least one preferred size for the pet hood. Once the desired size is known, a predetermined integer number of repeating shapes are selected in step 430 and then cut from the resilient mesh in step 435 to at least equal the preferred size. This yields a pet hood preform. The preform may be packaged together with push pin 210 and drawstring 140 in a compact and flat retail package for distribution. At the time of assembly for use, a person will engage a first cut edge transverse to web 220 to a second cut edge to form a tubular pet hood intermediate assembly product, as shown at step 440. Once the generally tubular structure is formed, and it is noted here that in the event only four segments 222 are used, the tube may be a four-sided tube, a first end of the tubular pet hood intermediate assembly product is enclosed by engaging at least two protruding tips 224, as shown in step 445. This will most preferably be achieved without tools using the likes of push pin 210 illustrated in FIG. 3, which will pass through a hole such as hole 226 in protruding top 224. Other techniques may be used, such as the welding, adhesive bonding and the like mentioned herein above with reference to hood 100. However, a push pin 210 is much preferred for use by the general public and such pin allows flat packaging and shipping. Next, in step 450, at least two trapezoidal bottoms 230 are bound together to contract a second end of pet hood 200. This may be accomplished by folding portion 235 about fold line 232, and slipping drawstring 140 through the opening. Once in place, drawstring 140 may be drawn tight and tied. A final step of anchoring drawstring 140 to another harness or the like is shown in step 455.

The present invention offers a number of benefits not heretofore available, including the fact that the hood is not harmful when swung by the animal. The hood offers ready manufacture for low cost in both low and high volume production. Additionally, the pet hood further accommodates various sizes of hoods, such as small, medium and large, without requiring retooling, and, using hood 200, only requires three distinct components.

While the foregoing details what is left to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A pet hood, comprising:
    a resilient, semi-rigid mesh adapted for fully encompassing a pet head and having openings therein which both permit clear vision therethrough and permit the passage of air while simultaneously preventing the penetration of teeth therethrough formed into repeating sections, each of said repeating sections having a protruding tip, a generally rectangular body, and a tail;
    a fastener attaching at least two repeating section protruding tips together to form a closure at a first end; and
    a gathering member collecting at least two repeating section tails together to form a neck member.

2. The pet hood of claim 1 wherein said tail further comprises a trapezoidal geometry.

3. The pet hood of claim 1 wherein said gathering member further comprises a flaccid cord.

4. The pet hood of claim 3 wherein said gathering member further comprises lacing.

5. The pet hood of claim 1 wherein sadi resilient, semi-rigid mesh is further comprised by a plastic material.

6. The pet hood of claim 1 wherein said neck member further comprises means for attachment to another anchor associated with a pet.

7. An animal restraint encircling the head of an animal from said animal's neck region about said animal's nasal region, comprising:
    a compliant and resilient neck encompassing member;
    a tensioning member for adjusting a diameter of said compliant and resilient neck encompassing member to accommodate said animal's neck region in contact therewith through a majority of said animal's neck circumference;
    a semi-rigid hood member extending generally from said compliant and resilient neck encompassing member to said animal's nasal region and encompassing said animal's head therein consisting essentially of a resilient, semi-rigid mesh adapted for fully encompassing a pet head and having openings therein which both permit clear vision therethrough and permit the passage of air while simultaneously preventing the penetration of teeth therethrough;
    a forward enclosing member generally enclosing said semi-rigid hood member distal to said compliant and resilient neck encompassing member;
    said compliant and resilient neck encompassing member, said semi-rigid hood member, and forward enclosing member each comprised by a plurality of repeating segments of said resilient, semi-rigid mesh;

said repeating segments having a protruding tip, body and tail, said repeating segment tips forming said forward enclosing member, said repeating segment bodies forming said semi-rigid hood member, and said repeating segment tails forming said compliant and resilient neck encompassing member; and a securing member for securing said forward enclosing member repeating segments together.

8. The animal restraint of claim 7 further comprising:
a harness about said animal's body; and
an anchoring member attaching said tensioning member to said harness.

9. The animal restraint of claim 8 wherein said anchoring member attaches said tensioning member to said harness behind said animal's front legs.

10. The animal restraint of claim 8 wherein said anchoring member comprises excess length of said tensioning member.

11. The animal restraint of claim 7 wherein said compliant and resilient neck encompassing member encircles said animal's neck region.

12. The animal restraint of claim 11 wherein said tensioning member encompasses said animal's neck through a full circumference.

13. The animal restraint of claim 7 wherein said semi-rigid hood member is generally tubular.

14. The animal restraint of claim 7 wherein said securing member comprises a push pin.

15. The animal restraint of claim 7 wherein said semi-rigid hood member further comprises a plastic mesh.

16. The pet hood of claim 1 wherein said repeating section generally rectangular bodies form a generally tubular structure.

17. The pet hood of claim 1 wherein each of said at least two protruding tips further comprise a hole, and said fastener further comprises a push pin adapted for passing through and being retained within said protruding tip holes.

18. An animal restraint encircling the head of an animal from said animal's neck region about said animal's nasal region, comprising:

a compliant and resilient neck encompassing member;

a drawstring for adjusting a diameter of said compliant and resilient neck encompassing member to accommodate said animal's neck region in contact therewith through a majority of said animal's neck circumference;

a semi-rigid hood member extending generally from said compliant and resilient neck encompassing member to said animal's nasal region and encompassing said animal's head therein consisting essentially of a resilient, semi-rigid mesh adapted for fully encompassing a pet head and having openings therein which both permit clear vision therethrough and permit the passage of air wile simultaneously preventing the penetration of teeth therethrough;

a forward enclosing member generally enclosing said semi-rigid hood member distal to said compliant and resilient neck encompassing member;

said compliant and resilient neck encompassing member, said semi-rigid hood member, and forward enclosing member each comprised by a plurality of repeating segments of said resilient, semi-rigid mesh, said repeating segments each having a triangular forward enclosing segment, a rectangular hood member segment, and a trapezoidal neck encompassing segment, said plurality of triangular forward enclosing segments combining to form said forward enclosing member, said plurality of said rectangular hood member segments combining to form said semi-rigid hood member, and said plurality of said trapezoidal neck encompassing segments combining to form said compliant and resilient neck encompassing member; and a push pin for securing said plurality of triangular forward enclosing segments together.

* * * * *